United States Patent [19]

Matsumoto

[11] 4,265,202

[45] May 5, 1981

[54] INDUCTION SYSTEM FOR AN INTERNAL COMBUSTION ENGINE

[75] Inventor: Hiromitsu Matsumoto, Hamamatsu, Japan

[73] Assignee: Yamaha Hatsukoki Kabushiki Kaisha, Iwata, Japan

[21] Appl. No.: 937,703

[22] Filed: Aug. 29, 1978

[30] Foreign Application Priority Data

Sep. 3, 1977 [JP] Japan .................. 52-106030

[51] Int. Cl.³ ............................ F02B 31/00
[52] U.S. Cl. .................... 123/308; 123/432
[58] Field of Search ............ 123/103 R, 127, 122 AB, 123/122 AC, 75 B; 261/23 A, 65 R, 39 A

[56] References Cited

U.S. PATENT DOCUMENTS

| | | | |
|---|---|---|---|
| 2,028,585 | 1/1936 | Blake | 123/119 R |
| 2,038,157 | 4/1936 | Aseltine | 123/52 M |
| 2,395,264 | 2/1946 | Gardner | 261/23 A |
| 3,359,958 | 12/1967 | Von Seggern | 123/308 |
| 3,408,992 | 11/1968 | Von Seggern | 123/52 M |
| 3,543,736 | 12/1970 | Suzuki | 123/75 B |
| 3,554,174 | 1/1971 | Clawson | 123/127 |
| 3,659,564 | 5/1972 | Suzuki | 123/122 A |
| 3,678,905 | 7/1972 | Diehl | 123/75 B |
| 3,713,636 | 1/1973 | LaPrade | 123/119 R |
| 4,002,704 | 1/1977 | LaPrade | 261/23 A |
| 4,018,199 | 4/1977 | Furucz | 123/127 |
| 4,132,197 | 1/1979 | Hanawa | 123/75 B |
| 4,151,820 | 5/1979 | Furacz | 123/127 |

FOREIGN PATENT DOCUMENTS

| | | | |
|---|---|---|---|
| 2617728 | 5/1977 | Fed. Rep. of Germany | 261/39 A |
| 52-29534 | 3/1977 | Japan | 123/75 B |

*Primary Examiner*—Ronald H. Lazarus
*Attorney, Agent, or Firm*—Ernest A. Beutler

[57] ABSTRACT

An induction system for an internal combustion engine consisting of a relatively large main induction system and a relatively small sub or auxiliary induction system. A throttle valve arrangement is provided so that a charge, issuing from a charge forming device, is delivered to the engine combustion chambers through the small auxiliary induction system during idle and light load operation. This increases the velocity of the charge entering the combustion chambers and the turbulence in the chamber at the time of ignition. As a result, combustion propagation is increased and both fuel economy and cleanness of running are improved. In higher loads, an increasing proportion of the charge is delivered to the combustion chambers through the main induction passage so as to provide good volumetric efficiency and insure against the loss of performance. In accordance with this invention, the auxiliary induction passage discharges into the chambers in a direction that is tangent to the cylinder, which crosses the gap of the spark plug and which passes across the exhaust and intake valves in that sequence.

9 Claims, 6 Drawing Figures

INDUCTION SYSTEM FOR AN INTERNAL COMBUSTION ENGINE

BACKGROND OF THE INVENTION

This invention relates to an induction system for an internal combustion engine and more particularly an induction system that improves engine performance at the low and idle running conditions.

The sizing and configuration of the induction system for an internal combustion engine is a compromise to satisfy a wide variety of running conditions. If the induction system is large enough so as to not restrict full power output, the intake charge will pass through the system and into the combustion chambers at a relatively slow velocity at idle and low speed. The low rate of air flow through the induction system under these conditions causes condensation of the fuel in the induction passages, particularly at lower temperatures. Furthermore, the low speed of the induction into the chambers causes uneven running. Therefore, it has been previously the practice to provide overly rich mixtures to compensate for these effects. Of course, poor fuel economy and the emission of large amounts of unwanted exhaust gas constituents results.

In order to overcome these effects and improve overall engine performance it has been proposed to provide, in addition to the main induction system, a relatively small cross-sectional area, sub-induction system. The flow through the various induction systems is controlled by a series of throttle valves so that the low and idle load charge requirements of the engine are supplied through the sub-induction system and the higher load requirements are supplied primarily through the main induction system. By introducing the lower load range requirements of the engine through the smaller cross-sectional area passages, the likelihood of fuel condensation is reduced. Furthermore, turbulence is introduced in the charge in the chamber at the time of ignition, increasing the rate of flame propagation and providing smoother, more complete combustion.

Using this concept, it is an object of this invention to still further improve the combustion of an internal combustion engine through the use of an improved induction system.

It is another object of the invention to provide an induction system for internal combustion engines that permits accurate control of the direction of charge movement in the combustion chamber immediately prior to and at the time of combustion.

SUMMARY OF THE INVENTION

A first feature of this invention is adapted to be embodied in an internal combustion engine having a variable volume chamber in which combustion occurs, a spark plug for firing a charge in the chamber and a main intake passage communicating with the chamber through a main intake port for delivering a charge. In accordance with this feature of the invention a sub-intake passage is also provided which communicates with the chamber through a sub-intake port that has an effective cross-sectional area substantially less than that of the main intake port so that a charge entering the chamber through the sub-intake port delivers at a substantially greater velocity. Valve means are provided for controlling the ratio of communication of the ports with the chamber during a given cycle of engine operation. In accordance with the first feature of the invention, the sub-intake port is oriented relative to the chamber so that the charge inducted through this port passes across the spark plug gap at the time of ignition.

Another feature of the invention is adapted to be embodied in an internal combustion engine having main and sub-intake passages as described in the preceding paragraph. In connection with this feature of the invention, the chamber is formed in part by a cylinder and the sub-intake port and sub-intake passage are oriented relative to the cylinder so that the charge inducted through the sub-intake system flows in a generally tangential direction to the cylinder.

In connection with a third feature of the invention, main and sub-intake passages as described in the first paragraph of this summary are employed. Each chamber is also served with an exhaust port having an exhaust valve for controlling the flow through that port. In accordance with this feature, the sub-intake port is oriented so that the intake charge passes across the face of the exhaust valve before it passes the spark plug gap.

DETAILED DESCRIPTION OF THE PREFERRED EMBODIMENT

Figure 1:
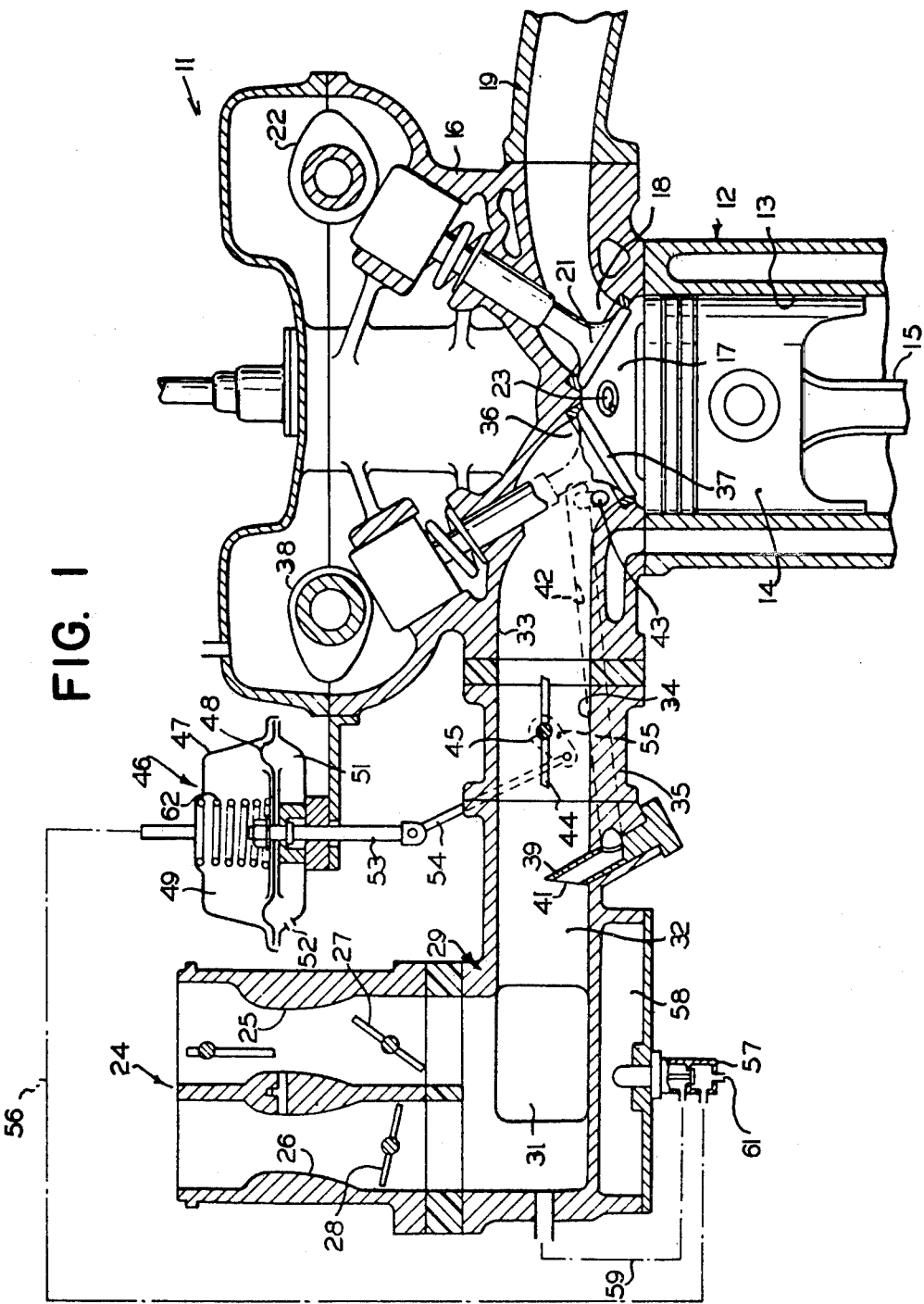
FIG. 1 is a vertical cross-sectional view of an internal combustion engine embodying this invention and is taken generally along the line 1—1 of FIG. 2.
Figure 2:
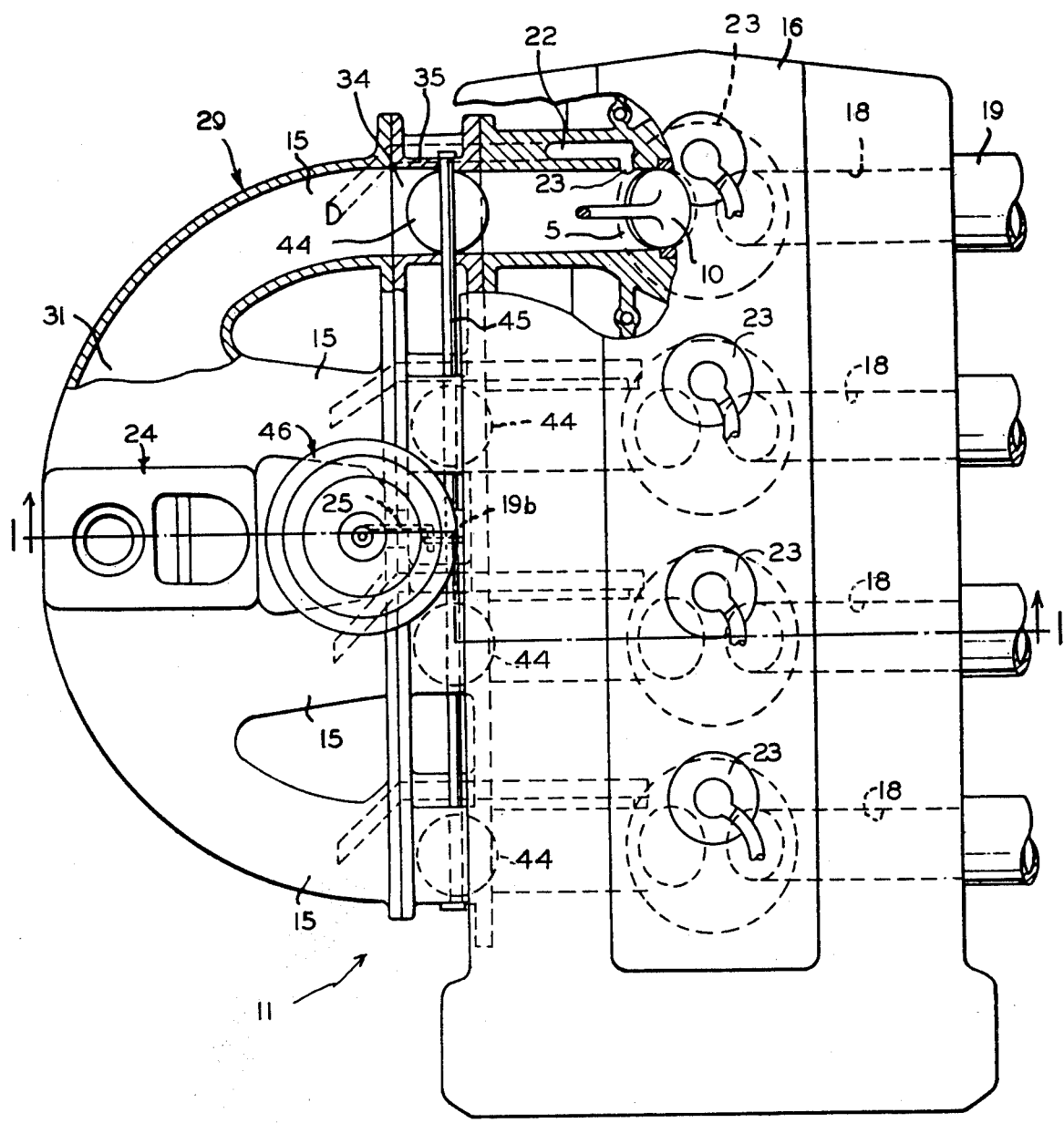
FIG. 2 is a top plan view, with portions broken away, of an internal combustion engine embodying this invention.
Figure 3:
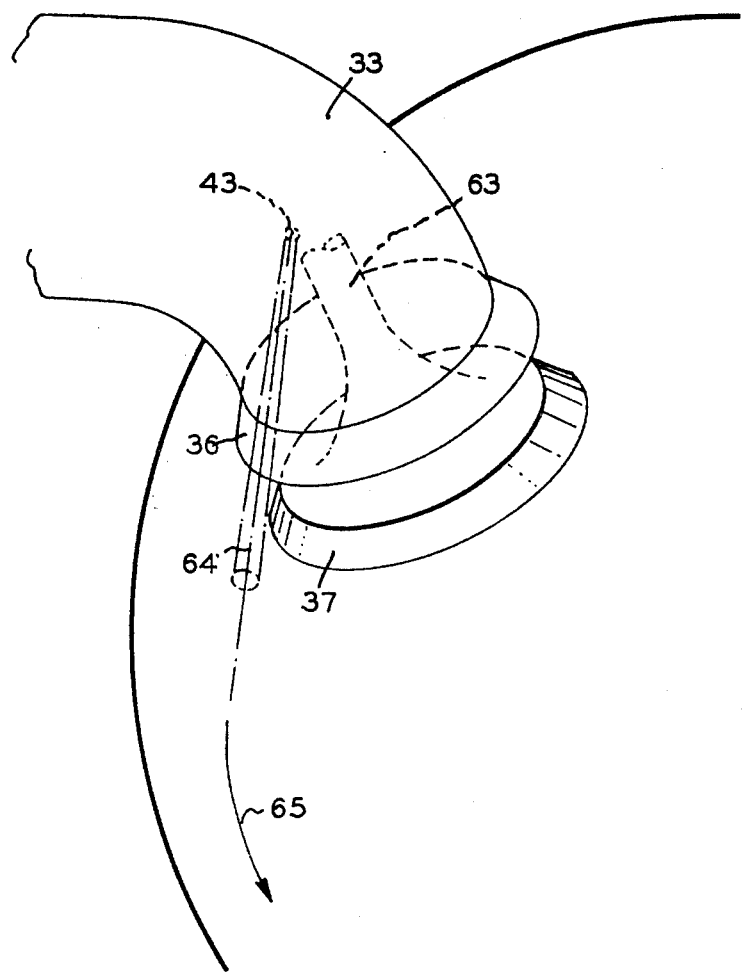
FIG. 3 is a schematic perspective view of one cylinder of the invention shown in FIGS. 1 and 2 and shows the orientation of the intake ports and their relation to the open intake valve.
Figure 4:
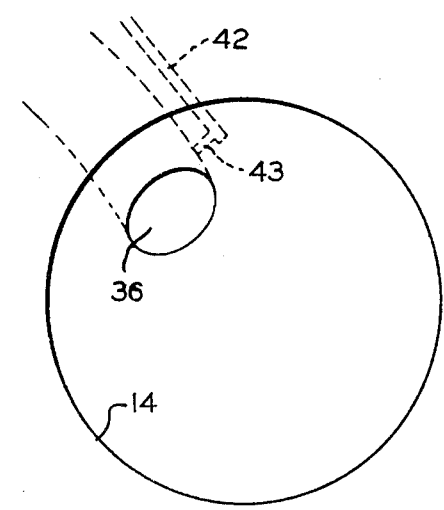
FIG. 4 is a schematic top plan view showing the port orientation of the embodiment of FIGS. 1 through 3.

Referring first to the embodiment of FIGS. 1 through 4, an internal combustion engine having an induction system embodying this invention is identified generally by the reference numeral 11. The engine 11 includes a cylinder block 12 having a plurality of cylinder bores 13, there being four in the illustrated embodiment. Pistons 14 are reciprocally supported in the cylinder bores 13 and drive a crankshaft (not shown) in a known means by means of connecting rods 15. A cylinder head, indicated generally by the reference numeral 16, is affixed to the cylinder block 12 and has a number of cavities 17 which cooperate with the cylinder bores 13 and pistons 14 to form chambers of variable volume (combustion chambers). Exhaust ports 18 extend through the exhaust side of the cylinder head 16 from each of the chambers 17 to an exhaust manifold 19. Exhaust valves 21, operated by an exhaust cam shaft 22 control the flow through the exhaust passages 18.

A spark plug 23 is positioned in each of the chambers 17 and is fired in a known manner. The spark plugs 23 are oriented in a specific relationship, as will become apparent as this description proceeds.

A charge forming device in the form of a staged or progressive carburetor, indicated generally by the reference numeral 24 is provided for delivering a fuel air charge to the chamber 17 through an induction system, to be described. The carburetor 24 consists of a main or primary barrel 25. A secondary barrel 26 is juxtaposed to the primary barrel 25. A primary or main throttle valve 27 controls the flow through the main barrel 25 and a secondary throttle valve 28 controls the flow through the secondary barrel 26. As is well known in the art, the primary barrel 25 serves the idle and low speed requirements of the engine and has suitable fuel discharge circuits for this purpose. The secondary barrel 26 cooperates with the primary barrel 25 to supply the charge requirements at higher power outputs and the throttle valves 27 and 28 are operated in a staged sequence in any known manner.

The induction system includes an intake manifold, indicated generally by the reference numeral 29 having a plenum chamber 31 that is in registry with the carburetor primary and secondary barrels 25 and 26. Accordingly, the charge delivered by these barrels will be discharged into the plenum 31. Main intake passages 32 radiate from the plenum 31 and discharge into individual main cylinder head intake passages 33 via main passages 34 formed in a valve block 35. The valve block 35 is positioned between the intake manifold 29 and the cylinder head 16.

The cylinder head main intake passages 33 terminate at the chambers 17 in intake ports 36. Intake valves, operated by an intake cam shaft 38, control the communication between the main intake ports 36 and the chambers 17.

The portion of the engine thus far described may be considered to be conventional. In accordance with the invention, in addition to the main intake system already described, a sub-intake system is also provided. The sub-intake system has a substantially lesser effective cross sectional area than the main intake system so that a given mass flow of charge entering the chambers 17 through the auxiliary or sub-intake system and flow at a substantially greater velocity to improve turbulence in the chamber 17 at the time of ignition by the spark plug 23. This has the effect of increasing the rate of flame propagation and, accordingly, improving combustion. Improved fuel economy and exhaust gas emission control results.

The auxiliary or sub-intake system includes an inlet tube 39 positioned in each of the runners 32. The tube 39 extends upwardly from the lower wall of the runner 32 and has its inlet end 41 positioned to face the direction of mixure flow through the runner 32 so as to provide a ram inlet effect.

Each inlet tube 39 communicates with an auxiliary intake passage 42 that extends through the manifold 29, valve block 35 and cylinder head 16 to a point adjacent the main intake port 36. A transverse passage intersects the passage 42 adjacent the valve port 36 and terminates in a sub-intake port 43. As will be noted, the sub-intake port 43 and passage which forms it is directed in a specific orientation so as to direct the flow of mixture from the sub-intake system into the chamber 17 in a desired pattern.

The amount of mixture delivered to the chambers 17 through the sub-intake system in relation to the amount of delivery through the main intake system is controlled by means of a plurality of auxiliary throttle valves 44, as positioned in a respective one of the passages 44 formed by the valve block 35. The auxiliary throttle valves 44 are all connected to a common valve shaft 45 that is journaled in the valve block 35. That position of the auxiliary throttle valves 44 is controlled by means of an actuator, indicated generally by the reference numeral 46, so that a substantial portion of the charge requirements of the chambers 17 at idle and low load is delivered through the sub-intake system. The actuator 46 is comprised of an outer housing 47 in which a diaphragm is positioned.

The diaphragm 48 divides the interior of the housing 47 into an upper, manifold pressure responsive chamber 49 and a lower chamber 51, which is vented to the atmosphere through a vent passage 52. A piston rod 53 is connected to the diaphragm 48 at one end and to a link 54 in the other end. The link 54 is, in turn, connected to a lever 55 that is affixed to the auxiliary throttle valve shaft 45. The conduit 56 interconnects the chamber 49 with the plenum 31 selectively via a temperature responsive valve 57. The temperature responsive valve 57 is of the wax pellet type and senses the temperature in a coolant heated hot spot 58 formed in the manifold 59 beneath the plenum 31 and the inlet to the runners 39. When the temperature of the coolant in the chamber 58 is above a predetermined value the valve 57 will open communication between the conduit 56 and a conduit 59 that extends into the plenum 31. When the temperature is below this predetermined temperature the conduit 56 will be placed in communication with an atmospheric vent 61 of the valve 57. The system described operates as follows:

When the engine is cold, as shown in FIG. 1, the temperature responsive valve 57 will function to open communication of the conduit 56 with the atmospheric vent 61. Atmospheric pressure will then exist in both chambers 49 and 52 of the actuator 46. A compression spring 62 in the chamber 49 urges the diaphragm 48 downwardly so as to cause full opening of the auxiliary throttle valves 44. The engine induction system will then operate in a substantially conventional manner.

When the temperature of the coolant in the chamber 58 reaches the predetermined temperature at which the temperature responsive valve 57 is actuated, the communication of the conduit 56 with the atmospheric vent 61 will be terminated and communication opened with the manifold passage 59. Thus, the actuator chamber 49 will sense the induction system pressure at the plenum 31. When this pressure is low, intake manifold vacuum high, as occurs during idle, off idle and on coasting, the reduced pressure in the actuator chamber 49 will cause the diaphragm 48 to be urged upwardly against the action of the spring 62 by the atmospheric pressure in the chamber 51. Assuming that this pressure is sufficiently low, the auxiliary throttle valves 54 will be moved to a fully closed position. Thus, the induction charge for the chambers 17 will be diverted into the auxiliary induction passage inlet 41 and delivered through the auxiliary induction passages 42. Due to the relatively small cross sectional area of the passages 42, the charge will flow through these passages at a relatively high velocity. The induction of this high velocity flow into the chambers 17 increases the turbulence in the chambers, particularly at the time of ignition by the spark plug 23. Therefore, combustion is improved due to the relatively high rate of flame propagation and fuel economy is increased and the emission of unwanted exhaust gas constituents is decreased.

As has been previously noted, the auxiliary intake port 43 is oriented so as to provide the desired degree of turbulense and further to establish the desired direction of motion of the charge in the chamber 17 at the time of ignition. This may be best understood by reference to FIGS. 3 and 4, where the orientation of the relative components is illustrated.

The auxiliary intake port 43 and the passage leading to it is located in the cylinder head induction passage 33 adjacent to the main intake port 36. The port 43 is offset to one side of the port 36 from the stem 63 of the intake valve 37. The mixture discharged from the port 43 will, therefore, flow in a pattern as indicated by the dot dash cylinder 64. When the intake valve 37 is opened, neither its head nor the valve stem 63 will obstruct the flow out of the port 43. Thus, not only is restriction avoided but also the desired flow pattern may be maintained.

Preferably, the discharge pattern of the auxiliary intake port 43 (the path 64) is oriented so that the charge flows into the cylinder bore 14 in a generally tangential manner. Thus, a swirling motion, as indicated generally by the arrow 65, is induced in the chamber 17. The spark plug gap 23 is positioned in such a location as to be in the path of flow 65 so as to insure not only good combustion but also to scavenge the air and fuel which surrounds the plug gap. As a further feature of the invention, the inducted charge will flow from the port 43 across the face of the exhaust valve 21 before it passes the spark plug 23. Thus, the charge will be headed by the hot exhaust valve face and vaporization prior to combustion will be improved.

The auxiliary induction passage 42 of the cylinder head 16 and the port 43 may be conveniently formed in the described embodiment by two drilling operations.

Figure 5:
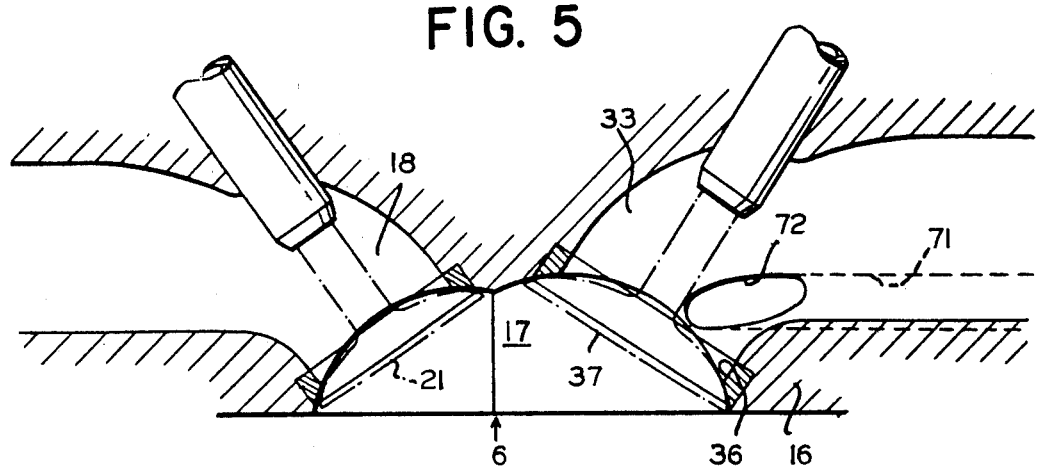
FIG. 5 is a partial cross sectional view of the cylinder head of another embodiment of the invention.
Figure 6:
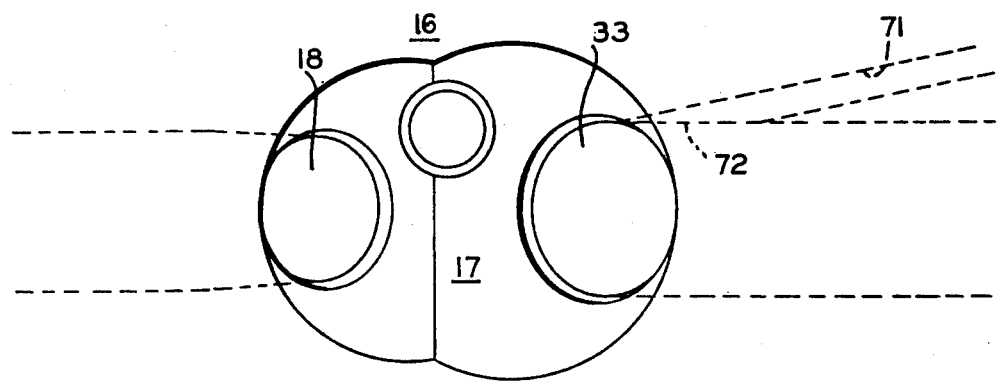
FIG. 6 is a bottom plan view of the portion of the cylinder head shown in FIG. 5 and is taken generally in the direction of the arrow 6 in FIG. 5.

FIGS. 5 and 6 show a somewhat similar embodiment wherein the auxiliary induction passage and its discharge port may be formed by a single drilling operation. In this embodiment only the configuration of the auxiliary induction port differs from that of the embodiment of FIGS. 1 through 4. For this reason, components which have the same construction as in the previously described embodiment have been identified by the same reference numerals and will not be described again. In this embodiment, an auxiliary induction passage 71 is formed through a drilling operation. The drill which forms the passage 71 extends nearly parallel to the main induction passage 33 and intersects this passage in a port 72 adjacent the head of the intake valve 37, and specifically adjacent the main intake port 36. With such an arrangement, there is less latitude in determining the orientation of flow of the intake charge, however, the restriction caused by the angled bend of the preceding embodiment is avoided.

It is to be understood that the foregoing description is that of two preferred embodiments of the invention and that various changes and modifications may be made without departing from the spirit and scope of the invention, as defined by the appended claims.

We claim:

1. In an internal combustion engine having a substantially open variable volume chamber in which combustion occurs, a spark plug positioned in said open variable volume chamber for filing a charge in said chamber and a main intake passage communicating with said chamber through a main intake port for delivering a charge therethrough, the improvement comprising a sub-intake passage communicating with said chamer through a sub-intake port, said sub-intake passage having an effective cross-sectional area substantially less than the effective cross-sectional area of said main intake passage for causing a given mass flow of charge through said sub-intake port to enter said chamber at a significantly greater velocity, said sub-intake port communicating with said main intake passage contiguous to said main intake port, said sub-intake port being oriented relative to said chamber and said spark plug for directing charge entering said chamber through said sub-intake port across said spark plug at the time of ignition, and valve means for controlling the ratio of the communication of said ports with said chamber during a given cycle operation of said engine.

2. In an internal combustion engine as set forth in claim 1 further including an intake valve interconnecting the main intake passage with the chamber and an exhaust valve for controlling the communications between the chamber and an exhaust passage.

3. An internal combustion engine as set forth in claim 2, wherein the charge entering the chamber through the sub-intake port passes across the head of the intake valve prior to passage across the head of the exhaust valve in the chamber.

4. An internal combustion engine as set forth in claim 3, wherein the sub-intake port discharges into the main intake passage upsstream of the intake valve for discharge into the chamber through the open intake valve.

5. An internal combustion engine as set forth in claim 4, wherein the intake valve is a poppet valve and the sub-intake port is disposed between the stem of the intake valve and the periphery of the chamber so that the flow of a charge through the sub-intake port does not impinge upon the intake valve stem during induction.

6. An internal combustion engine as set forth in claim 5, wherein the chamber is formed in part by a cylinder bore the sub-intake port being oriented so that the charge delivered to the chamber through said sub-intake passage flows tangentially to said cylinder bore.

7. In an internal combustion engine having a variable volume chamber in which combustion occurs, said chamber being defined in part by a cylindrical bore, and a main intake passage communicating with said chamber through a main intake port for delivering a charge therethrough, the charge delivered to said chamber through said main intake port being delivered to said chamber in a non-tangential relationship thereto, the improvement comprising a sub-intake passage communicating with said chamber through sub-intake port, said sub-intake port being in communication with said main intake passage upstream of said main intake port, said sub-intake passage having an effective cross-sectional area substantially less than the effective cross-sectional area of said main intake passage for causing a given mass flow of charge through said sub-intake port to enter said chamber at a significantly greater velocity, said sub-intake port being oriented relative to said cylinder bore for directing a charge through said sub-intake port in a tangential direction relative to said cylindrical bore, and valve means for controlling the ratio of communication of said ports with said chamber during a given cycle of operation of said engine, said sub-intake port being disposed in relation to said chamber to that the charge delivered to said chamber through said sub-intake port enters said chamber at substantially undiminished velocity when said valve means causes a substantial portion of the charge to be delivered to said chamber through said sub-intake port.

8. In an internal combustion engine as set forth in claim 7, an intake valve interconnecting the main intake passage with the chamber and an exhaust valve for controlling the communications between the chamber and an exhaust passage.

9. In an internal combustion engine as set forth in claim 8, wherein the intake valve is a poppet valve and the sub-intake port is disposed between the stem of the intake valve and the periphery of the chamber so that the flow of a charge through the sub-intake port does not impinge upon the intake valve stem during induction.

* * * * *